United States Patent
Colten, II

(10) Patent No.: US 10,619,355 B2
(45) Date of Patent: Apr. 14, 2020

(54) ENGINEERED WOOD PLANKS

(71) Applicant: James Colten, II, Midlothian, TX (US)

(72) Inventor: James Colten, II, Midlothian, TX (US)

(*) Notice: Subject to any disclaimer, the term of this patent is extended or adjusted under 35 U.S.C. 154(b) by 0 days.

(21) Appl. No.: 16/019,235

(22) Filed: Jun. 26, 2018

(65) Prior Publication Data

US 2019/0390464 A1    Dec. 26, 2019

(51) Int. Cl.
| | |
|---|---|
| *E04F 15/02* | (2006.01) |
| *B27D 1/04* | (2006.01) |
| *B27M 3/06* | (2006.01) |
| *E04F 15/04* | (2006.01) |
| *B32B 21/13* | (2006.01) |
| *B32B 21/14* | (2006.01) |
| *B32B 37/00* | (2006.01) |

(52) U.S. Cl.
CPC .......... *E04F 15/02005* (2013.01); *B27D 1/04* (2013.01); *B27M 3/06* (2013.01); *E04F 15/045* (2013.01); *B32B 21/13* (2013.01); *B32B 21/14* (2013.01); *B32B 37/0053* (2013.01); *B32B 2317/16* (2013.01)

(58) Field of Classification Search
CPC .......................... E04F 15/02005; E04F 15/045
See application file for complete search history.

(56) References Cited

U.S. PATENT DOCUMENTS

| | | | | |
|---|---|---|---|---|
| 2,732,597 | A * | 1/1956 | Contratto | B27M 3/04 |
| | | | | 52/590.2 |
| 4,242,390 | A * | 12/1980 | Nemeth | E04F 15/02 |
| | | | | 428/189 |
| 5,985,398 | A * | 11/1999 | Bellegarde | B27M 3/04 |
| | | | | 428/54 |
| 6,596,362 | B1 * | 7/2003 | Chung | B32B 21/13 |
| | | | | 428/54 |
| 8,935,899 | B2 * | 1/2015 | Bergelin | E04B 5/00 |
| | | | | 52/578 |
| 2003/0182880 | A1 * | 10/2003 | Weaber | B27M 3/04 |
| | | | | 52/179 |
| 2007/0292656 | A1 * | 12/2007 | Handojo | B27D 1/06 |
| | | | | 428/106 |
| 2013/0199120 | A1 * | 8/2013 | Bergelin | E04B 5/00 |
| | | | | 52/588.1 |
| 2015/0050443 | A1 * | 2/2015 | Roy | B32B 21/02 |
| | | | | 428/58 |
| 2018/0163412 | A1 * | 6/2018 | Qiao | E04F 15/045 |
| 2018/0266121 | A1 * | 9/2018 | Meersseman | E04F 15/02038 |

* cited by examiner

*Primary Examiner* — Rodney Mintz
(74) *Attorney, Agent, or Firm* — James R. Gourley; Carstens & Cahoon, LLP

(57) ABSTRACT

An engineered wood plank made using a unique lamella layer. The lamella layer has a number of lamella layer sections joined together by lap splice joints which allow the lamella layer to be pressure adhered onto a backing material without breaking, and wear in a manner similar to known engineered hardwood flooring.

8 Claims, 2 Drawing Sheets

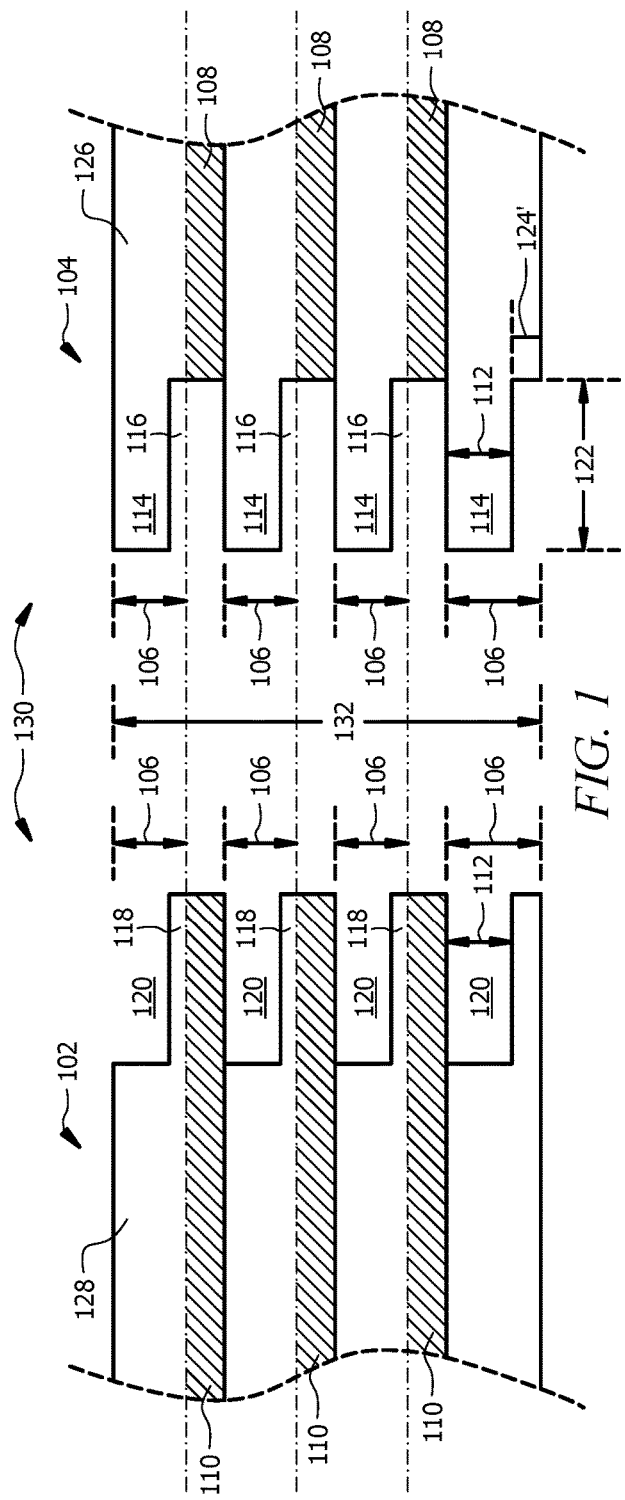
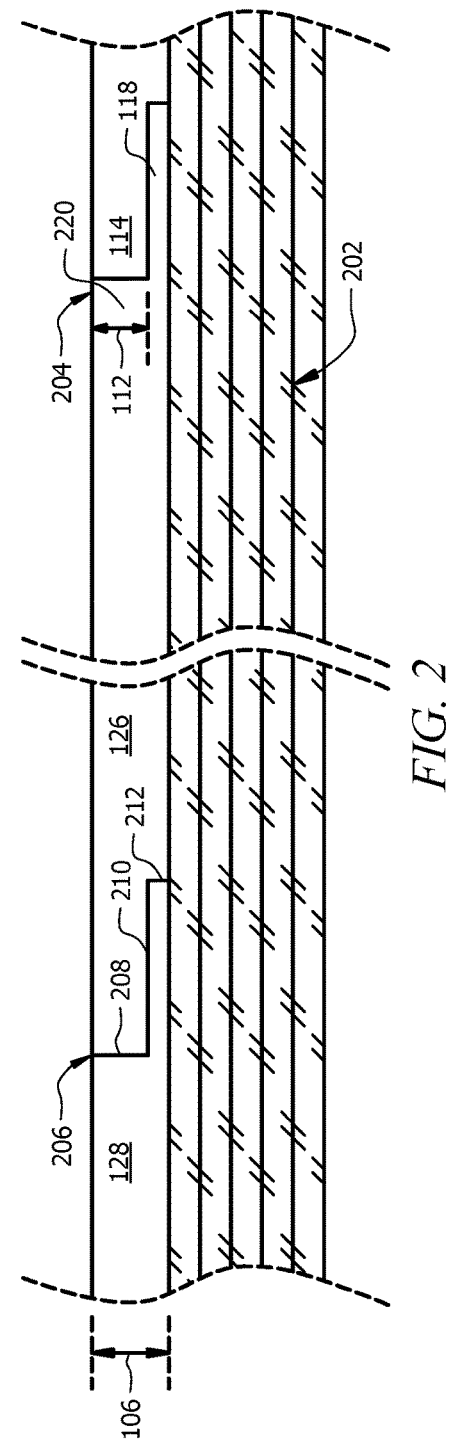
FIG. 1
FIG. 2

ENGINEERED WOOD PLANKS

BACKGROUND OF THE INVENTION

Technical Field

The present invention relates to engineered wood planks and methods of making engineered wood planks, which are used to cover, for example, floors, walls and ceilings.

Description of Related Art

Engineered wood planks are sometimes referred to in the art as composite wood planks or manufactured wood planks. Generally, engineered wood planks are manufactured by adhering a thin wood veneer—sometimes referred to in the art as a lamella—to a thicker backing material, such as plywood or fiberboard. The use of a thin veneer enables a practitioner to lay the engineered wood planks veneer side up such that the planks look like whole boards made entirely of the wood used in the thin veneer layer. Such engineered wood planks are generally more cost-effective than wood planks consisting entirely of the wood used in the thin veneer layer. Engineered wood planks can also be made with backing materials that provide novel and improved properties.

SUMMARY OF THE INVENTION

In one exemplary embodiment of the present invention, an engineered wood plank comprises: a lamella layer and a backing material; wherein the lamella layer comprises a bottom surface adhered to the backing material, a top surface opposite the bottom surface, a length, a width, and a thickness; wherein the lamella layer comprises a first lamella layer section and a second lamella layer section along the length of the lamella layer; wherein the first lamella layer section is adhered to the second lamella layer section by a first lamella lap splice joint; wherein the first lamella lap splice joint consists essentially of: a first lap joint section extending approximately perpendicularly from the top surface of the lamella layer toward the bottom surface of the lamella layer and having a first lap joint section length greater than half of the thickness of the lamella layer; a second lap joint section extending approximately parallel with the top surface of the lamella layer from an end of the first lap joint section opposite the top surface of the lamella layer and having a second lap joint section length greater than twice the first lap joint section length; and a third lap joint section extending approximately perpendicularly from the bottom surface of the lamella layer to an end of the second lap joint section opposite the first lap joint section and having a third lap joint section length.

In another exemplary embodiment according to any other individual exemplary embodiment or combination of exemplary embodiments, the engineered wood plank may comprise any one or combination of the following features: the first lap joint section length is greater than 75% of the thickness of the lamella layer; the second lap joint section length is greater than 2.5 times the first lap joint section length; the third lap joint section length is less than 1.0 millimeters (0.03937 in.); the second lap joint section length is greater than 6.0 millimeters (0.23622 in.); the second lap joint section length is greater than 7.0 millimeters (0.27559 in.); the second lap joint section length is greater than 8.0 millimeters (0.31496 in.).

In another exemplary embodiment of the present invention, a method of making a lamella layer comprises: joining a plurality of lamella precursor sections together to form a lamella precursor board, wherein each lamella precursor section is joined to at least one other lamella precursor section by a finger joint, wherein each lamella precursor section comprises a length, a width and a thickness, wherein the width of each lamella precursor section is approximately equal to the width of every other lamella precursor section, wherein the thickness of each lamella precursor section is approximately equal to the thickness of every other lamella precursor section, wherein the lamella precursor sections are joined together in coplanar orientation to each other, wherein the finger joint comprises a plurality of fingers, wherein each finger comprises a width approximately equal to the width of the lamella precursor section, wherein the lamella precursor board has a width equal to the width of each lamella precursor section, wherein the lamella precursor board has a thickness equal to the thickness of each lamella precursor section, wherein the lamella precursor board has a length; cutting the lamella precursor board into a plurality of lamella layer planks, wherein each lamella layer plank comprises a top surface and a bottom surface, wherein each lamella layer plank comprises a width approximately equal to the width of the lamella precursor board, wherein each lamella layer plank comprises a length approximately equal to the length of the lamella precursor board, and wherein each lamella layer plank comprises a thickness between the top surface and bottom surface which is approximately equal to the thickness of one finger of the finger joint plus a portion of an adjacent finger remaining after the cutting step, wherein each lamella layer plank comprises a plurality of lamella layer sections, wherein the number of lamella layer sections equals the number of lamella precursor sections, wherein each lamella layer section is joined to at least one other lamella layer section by a lamella lap splice joint, wherein each lamella lap splice joint consists essentially of: a first lap joint section extending approximately perpendicularly from the top surface of the lamella layer plank toward the bottom surface of the lamella layer plank and having a first lap joint section length greater than half of the thickness of the lamella layer plank; a second lap joint section extending approximately parallel with the top surface of the lamella layer plank from an end of the first lap joint section opposite the top surface of the lamella layer plank and having a second lap joint section length greater than twice the first lap joint section length; and a third lap joint section extending approximately perpendicularly from the bottom surface of the lamella layer plank to an end of the second lap joint section opposite the first lap joint section and having a third lap joint section length.

In another exemplary embodiment if the present invention, a method of making an engineered wood floor plank comprises the step of adhering a lamella layer plank that has any one or combination of the features described herein to a backing material plank.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 1 is an exploded cross section of a lamella precursor board which is configured to be cut into separate lamella layers.

FIG. 2 is a cross section of an engineered wood plank according to one embodiment of the present invention.

DETAILED DESCRIPTION

Figure 3:
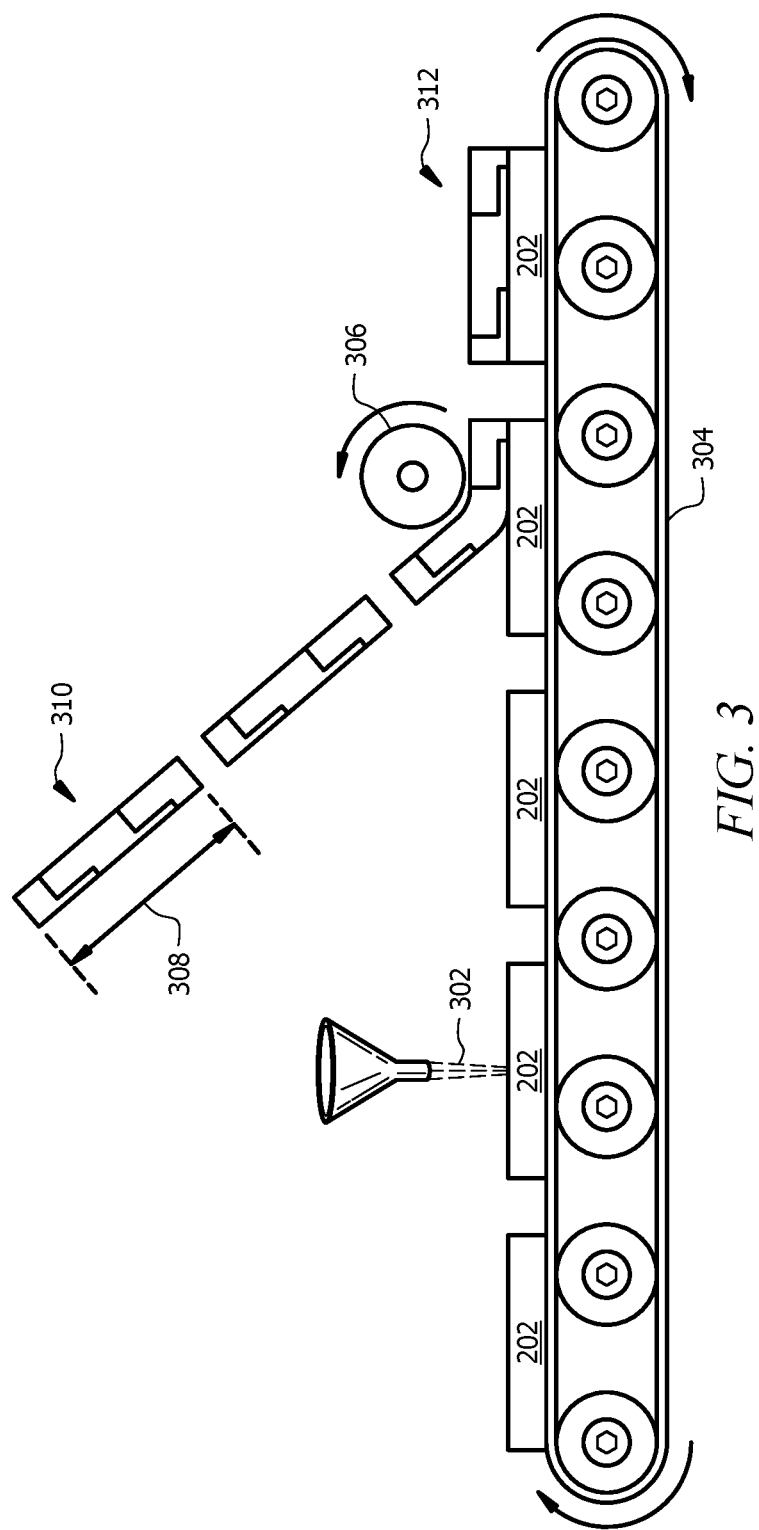
FIG. 3 is a diagrammatic representation of a portion of one embodiment of a manufacturing process used to make one embodiment of the engineered wood plank of the present invention.

The present invention relates to an engineered wood plank for use in covering a structural surface, such as a floor, wall, or ceiling. The engineered wood plank comprises a lamella layer adhered to a backing material. FIG. 3 depicts one embodiment of a process for making the engineered wood plank of the present invention.

As shown in FIG. 3, backing material planks 202 travel in series along a conveying means, such as conveyor 304. Adhesive 302 is applied to the top surface of the backing material planks 202 before the lamella planks 310 are adhered to the top surface of the backing material planks 202. The lamella planks 310 are adhered to the backing material planks 202 by pressure roller 306. During the adhering process, as depicted in FIG. 3, the lamella planks 310 are bent significantly as they are being pressure-adhered to the backing material planks 202. The end result of the process depicted in FIG. 3 is an engineered wood plank 312 comprising a lamella layer 310 adhered to a backing material 202. Notably, the process depicted in FIG. 3 only shows those portions of the process that are important for understanding the invention. Some supporting structures, conveying means, safety features and other aspects of the manufacturing equipment have been omitted to facilitate ease of reference. Further, not all elements shown in FIG. 3 are depicted in accurate absolute or relative scale in order to facilitate ease of reference.

One aspect of the present invention enables engineered wood planks to be manufactured in processes like the process depicted in FIG. 3, but using sections of wood in the lamella layer which are much shorter in length than the length of the final engineered wood plank. Preferably, engineered wood planks are manufactured in lengths of between 6 and 10 feet. Providing longer wood planks enables wood flooring installers to complete an install job much more quickly and efficiently than otherwise possible using shorter wood planks. Thus, in one aspect of the present invention, shorter sections of wood are joined together to form longer lamella layer planks having a length 308, which are then adhered to backing material planks of the same length. In one exemplary embodiment, the engineered wood planks made according to the present invention comprise a length of greater than 5 feet (1524 millimeters).

As described above and depicted in FIG. 3, during the manufacturing process, the lamella planks are typically bent significantly during the pressure adherence step, beneath the pressure roller 306. If the smaller lamella sections are not joined together properly, the pressure adherence step will tear the lamella plank apart as it is bent under high pressure, thereby preventing the production of engineered wood planks.

Longer engineered wood floor planks known in the art are typically produced by providing a lamella plank that is cut from a single piece of wood that is the same width and length as the backing material plank. For example, if it is desired to adhere a wooden lamella layer to a backing material plank 8 feet in length and 6 inches in width, the lamella layer will be cut from a solid board that is also 8 feet in length and 6 inches in width. Such boards are certainly available and result in high quality engineered flooring planks. However, some types of wood are not available or not widely available in 6- to 10-foot lengths. For example, mesquite wood is typically only found in boards having lengths of less than 5 feet. Moreover, for mesquite wood and other types of wood, shorter sections of wood are less expensive per foot and more widely available than longer sections.

The present invention can also be used to provide reclamation of scrap wood collected during the manufacture of other wood products, especially solid hardwood flooring. Smaller sections of wooden boards which would typically be seen as scrap wood created during a manufacturing or installation process could be joined together and cut according to the principles of the present invention to provide lamella layer planks, with each lamella layer plank comprising at least two sections joined by a lap splice joint as set forth herein, which is then adhered to a long backing material plank.

FIG. 2 depicts a cross section of an engineered wood plank according to one exemplary embodiment of the present invention. The cross section of FIG. 2 is taken approximately perpendicular to the top and bottom surfaces of the engineered wood plank, and parallel to the length of the engineered wood plank. The lamella layer 204 is shown adhered to backing material 202.

The lamella layer 204 has a thickness 106, a length which can be any length useful to a practitioner of the present invention, as indicated by the cutaway dashed lines at each side and in the middle of the engineered wood plank depicted in FIG. 2, and a width, perpendicular to the view shown in FIG. 2, which can also be any width useful to a practitioner of the present invention. In some exemplary embodiments, the total thickness of the lamella layer can be between about 3 millimeters (0.11811 in.) and about 5 millimeters (0.19685 in.). In some exemplary embodiments, the width of the engineered wood plank can be between about 50 and 300 millimeters (1.9685 and 11.811 in.).

The backing material 202 also has a length and width, each of which are equal to the length and width of the lamella layer, respectively. The thickness of the backing material can also be any thickness useful to a practitioner of the present invention.

FIG. 2 also depicts a first lamella section 128 joined to a second lamella section 126 by a lap splice joint 206. The structure of the lap splice joint is one aspect of the present invention that enables not just the manufacture of the engineered wood plank of the present invention, but the quality and durability of the resulting application of the engineered wood plank.

As shown in FIG. 2, the lap splice joint 206 comprises a first lap joint section 208, a second lap joint section 210, and a third lap joint section 212. The first lap joint section 208 extends approximately perpendicularly from the top surface of the lamella layer deeply into the lamella layer. It is important that the first lap joint section be approximately perpendicular to the top surface of the lamella layer because when the engineered wood plank is used as a floor covering, the wood surface will wear away over time. An angled or curved first lap joint section 208 could cause cosmetic or safety issues with the engineered wood plank because the lamella layer will not wear evenly when in use. A perpendicular first lap joint section ensures that the lamella layer will wear in a manner that is similar to whole board wood flooring and known engineered wood flooring.

Additionally, the first lap joint section must extend deeply into the lamella layer. Again, because wood flooring will wear over time, the length of the first lap joint section will equal the thickness of the "wear layer" 220 for a particular engineered wood floor plank made according to the invention herein. Once the wood floor has worn down to expose the second lap joint section, the wood floor should be replaced. Therefore, to get the most life out of an engineered wood plank, it is advantageous to provide the thickest wear layer 220 possible. In one embodiment, the length 112 of the first lap joint section is greater than half the total thickness 106 of the lamella layer. In a preferred embodiment, the length of the first lap joint section is greater than 75% of the total thickness 106 of the lamella layer.

The length of the second lap joint section is also important to the success of the present invention. As shown in FIG. 1, the length 122 of the second lap joint section is significantly longer than the length of the first lap joint section. The longer second lap joint section provides the stability and bond strength to allow the lamella layer to survive the bending and pressure applied during a manufacturing process like that shown in FIG. 3. The second lap joint section provides a large surface area for the adhesive used to bond the first and second sections of the lamella layer together. In one exemplary embodiment, the second lap joint section length is greater than 2.5 times the first lap joint section length. In another exemplary embodiment, the second lap joint section length is greater than 6.0 millimeters (0.23622 in.). In another exemplary embodiment, the second lap joint section length is greater than 7.0 millimeters (0.27559 in.). In another exemplary embodiment, the second lap joint section length is greater than 8.0 millimeters (0.31496 in.).

The third lap joint section 212 extends approximately perpendicularly from the bottom surface of the lamella layer to an end of the second lap joint section opposite the first lap joint section. The third lap joint section has a third lap joint section length 124. The third lap joint section length 124 is much shorter than the first lap joint section length 112 and the second lap joint section length 122. Further, the sum of the first lap joint section length 112 and the third lap joint section length 124 will approximately equal the total lamella layer thickness 106. In one exemplary embodiment, the third lap joint section length is less than 1.0 millimeters (0.03937 in.).

One embodiment of a method of making the lamella layer itself will now be described with reference to FIG. 1. FIG. 1 is an exploded cross section of one portion of a lamella precursor board 130. The lamella precursor board 130 depicted in FIG. 1 comprises a first precursor board section 102 and a second precursor board section 104. The lamella precursor board 130 may also comprise third, fourth, and more precursor board sections joined end to end, as described in more detail below. In other words, the lamella precursor board 130 may comprise a plurality (2 or more) precursor board sections joined together according to one aspect of the present invention.

Generally, the lamella precursor board is shaped as a right rectangular prism, comprising a thickness, a length and a width. The thickness is less than the width, and the width is less than the length.

The cross section of the lamella precursor board 130 shown in FIG. 1 depicts the thickness of the lamella precursor board 132. The thickness of the lamella precursor board is equal to each of the thickness of the first precursor board section 102, the thickness of the second precursor board section 104, and the thickness of each additional precursor board section, if present. The thickness of the lamella precursor board 132 will also be equal to the sum of the number of lamella layers produced times the thickness of each lamella layer, plus the thickness of the portions 108 and 110 of the lamella precursor board 130 that are removed by the saw blades during the cutting operation described in more detail below.

The lamella precursor board 130 also comprises a length, which can be virtually any length useful to a practitioner of the present invention, as represented by the curved, dashed cutaway lines at the left and right sides of FIG. 1. The length of the lamella precursor board 130 will be determined by the lengths of all precursor board sections used to make the precursor board 130, taking into account overlapping portions of the joints used to join the precursor board sections together.

The lamella precursor board 130 also comprises a width, which can also be virtually any width useful to a practitioner of the present invention. The width of the lamella precursor board runs approximately perpendicular to the view shown in FIG. 1. The width of the lamella precursor board 130 will be equal to each of the width of the first precursor board section 102 and the width of the second precursor board section 104, and any additional precursor board sections present.

The first precursor board section 102 and second precursor board section 104 are joined together by a finger joint. The finger joint comprises a series of fingers 114 on each board section, wherein each finger comprises a thickness 112 as measured parallel to the thickness of the lamella precursor board 130, a width equal to the width of the lamella precursor board, and a length 122 as measured parallel to the length of the lamella precursor board. The fingers 114 of each precursor board section mate with corresponding gaps 120 on the adjacent precursor board section, and consequently are adjacent to fingers on the adjacent precursor board section. Adhesive is applied to one or both of the fingers and/or gaps of each precursor board section before they are joined together. One skilled in the art can easily determine the type of adhesive to use after reading the disclosure provided herein.

After the precursor board sections have been joined to form the lamella precursor board 130, the lamella precursor board is cut into lamella layers. In the exemplary embodiment shown in FIG. 1, the lamella precursor board 130 is subjected to three separate cuts (which may occur simultaneously or in sequence—preferably simultaneously using three parallel-oriented saw blades) to produce four lamella layers, each having the same structure. The saw blades (not shown) are oriented approximately parallel to the top and bottom surfaces of the lamella precursor board.

During the cutting process, the line-shaded sections 110 and 108 are removed from the lamella precursor board 130 by action of the saw blade(s). The thickness of each of sections 110 and 108 is approximately equal to the width of the blade used to cut the lamella precursor board 130. As shown in the example of FIG. 1, the saw blades remove a portion of the fingers of the first precursor section 102, leaving a thin portion 118 of the finger. Similarly, the thickness of gaps 116 are also reduced to thickness 124 during the cutting process.

The cutting process described above produces four lamella layers. Each lamella layer has a width equal to the width of the lamella precursor board, which is consistent throughout its length and thickness; a length equal to the length of the lamella precursor board, which is consistent throughout its width and thickness; and a thickness 106 equal to the thickness 112 of one finger 114 on one precursor section plus the thickness 124 of remaining the thin portion 118 of a corresponding finger on the adjacent precursor section it is joined to, which thickness 106 is consistent through the width and length of the lamella layer.

Additionally, following the cutting process, each precursor section (e.g., 126 and 128) is joined together by a lap splice joint, as described above with reference to FIG. 2. The lamella layers so-produced can then be used in an engineered wood plank manufacturing process, such as the process depicted in FIG. 3.

It will now be evident to those skilled in the art that there has been described herein an engineered wood plank. Although the invention hereof has been described by way of preferred embodiments, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

The terms "about" or "approximately" as used herein are intended to encompass normal manufacturing tolerances and deviations from set point, which are readily apparent to one skilled in the art having the benefit of the disclosure herein. Even when the terms "about" or "approximately" are not used, the quantities and relationships described herein are understood to include normal manufacturing tolerances and deviations from set point, as understood by one skilled in the art.

In sum, while this invention has been particularly shown and described with reference to a preferred embodiment, it will be understood by those skilled in the art that various changes, in form and detail may be made therein without departing from the spirit and scope of the invention.

What is claimed is:

1. An engineered wood plank comprising:
   a lamella layer and a backing material;
   wherein the lamella layer comprises a bottom surface adhered to the backing material, a top surface opposite the bottom surface, a length, a width, and a thickness;
   wherein the lamella layer comprises a first lamella layer section and a second lamella layer section along the length of the lamella layer;
   wherein the first lamella layer section is adhered to the second lamella layer section by a first lamella lap splice joint;
   wherein the first lamella lap splice joint consists essentially of:
      a first lap joint section extending approximately perpendicularly from the top surface of the lamella layer toward the bottom surface of the lamella layer and having a first lap joint section length greater than half of the thickness of the lamella layer;
      a second lap joint section extending approximately parallel with the top surface of the lamella layer from an end of the first lap joint section opposite the top surface of the lamella layer and having a second lap joint section length greater than twice the first lap joint section length; and
      a third lap joint section extending approximately perpendicularly from the bottom surface of the lamella layer to an end of the second lap joint section opposite the first lap joint section and having a third lap joint section length;
   wherein the engineered wood plank comprises a wear layer extending from the top surface of the lamella layer and having a thickness equal to the first lap joint section length.

2. The engineered wood plank of claim 1 wherein the first lap joint section length is greater than 75% of the thickness of the lamella layer.

3. The engineered wood plank of claim 1 wherein the second lap joint section length is greater than 2.5 times the first lap joint section length.

4. The engineered wood plank of claim 1 wherein the third lap joint section length is less than 1.0 millimeters.

5. The engineered wood plank of claim 1 wherein the second lap joint section length is greater than 6.0 millimeters.

6. The engineered wood plank of claim 1 wherein the second lap joint section length is greater than 7.0 millimeters.

7. The engineered wood plank of claim 1 wherein the second lap joint section length is greater than 8.0 millimeters.

8. A method of making the engineered wood plank of claim 1 comprising the step of adhering the lamella layer to the backing material.

\* \* \* \* \*